No. 709,290. Patented Sept. 16, 1902.
G. F. ZINN.
DOUGH CUTTER.
(Application filed May 26, 1902.)

(No Model.)

Witnesses
R. R. Whiting
Arthur Kline

Inventor
George F. Zinn
by C. Spengel atty

UNITED STATES PATENT OFFICE.

GEORGE F. ZINN, OF CINCINNATI, OHIO.

DOUGH-CUTTER.

SPECIFICATION forming part of Letters Patent No. 709,290, dated September 16, 1902.

Application filed May 26, 1902. Serial No. 108,886. (No model.)

*To all whom it may concern:*

Be it known that I, GEORGE F. ZINN, a citizen of the United States, residing in the city of Cincinnati, in the county of Hamilton and State of Ohio, have invented a certain new and useful Dough-Cutter; and I do declare the following to be a clear, full, and exact description thereof, attention being called to the accompanying drawings, with the reference-numerals marked thereon, which form also a part of this specification.

This invention relates to improvements in dough-cutters, which are implements used for cutting out of flat-rolled dough portions of this latter preparatory to being baked. These flat pieces may be of various shapes as to outline and more or less ornamental—as, for instance, star-shaped or simply round, as in the case of biscuits, ginger-snaps, &c. Such implements consist generally of a short tube, the shape of its side in profile being such as to produce the shape to be cut. This tube is grasped at one end and with its other open end pressed into the flat-rolled dough until the edge of the side has entirely passed through the same, cutting out a piece therefrom corresponding to the shape of the tube. The dough-cutter is now lifted, carrying with it the piece of dough so cut out, which is presently caused to drop therefrom by shaking the implement. This method of removal is inconvenient and not always reliable or successful where the dough adheres persistently. In such cases the removal is generally accomplished by shaking the implement more forcibly until the dough becomes loose. When finally released under such circumstances, the contact succeeding its accelerated drop causes frequently the piece of dough to lose its intended shape. To avoid such contingencies, as well as to accomplish the quick and convenient removal of the dough without requiring the exertion attendant upon shaking the implement is the object of my invention, and the same consists, accordingly, of the means and their construction whereby this object is attained.

In the following specification and particularly pointed out in the claims is found a full description of the invention, together with its manipulation, parts, and construction, which latter is also illustrated in the accompanying drawings, in which—

Figure 1:
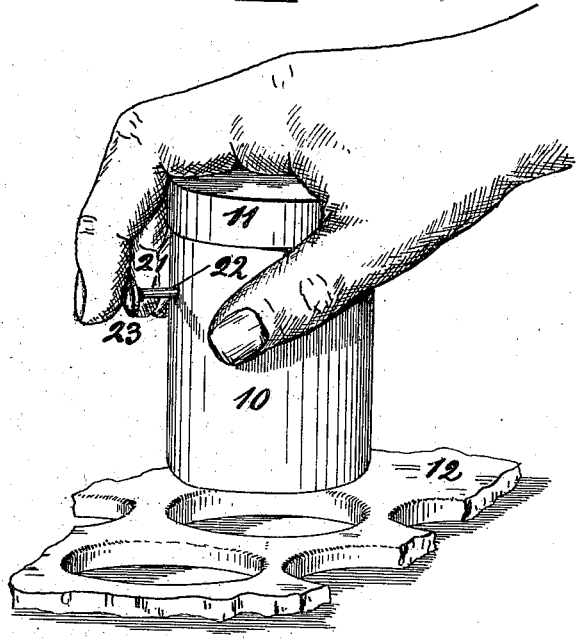
Figure 2:
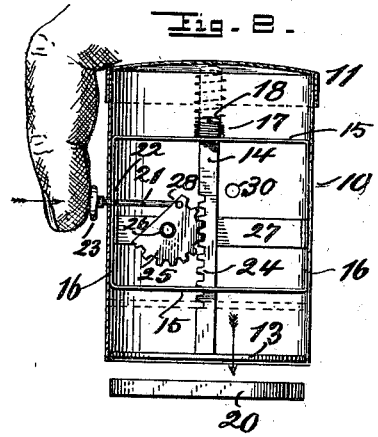
Figure 3:
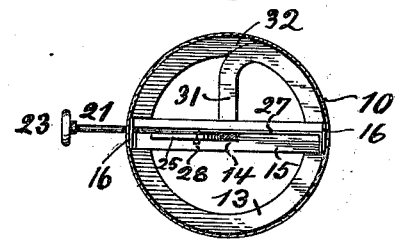
Figures 5, 6:
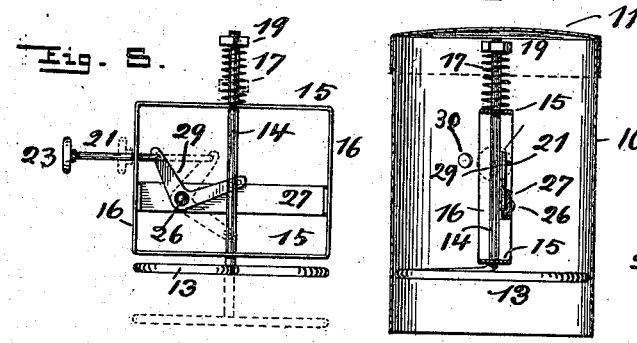

Figure 1, in a perspective view, shows my improved implement and the manner of its manipulation. Fig. 2 is a vertical section of the same, the dough cut out having just been expelled. Fig. 3 is a horizontal section, and Fig. 4 an under side view, of the preceding figure. Fig. 5 shows the movement mechanism and its supporting-frame detached, the former being modified against the construction shown in Fig. 2. Fig. 6 is a vertical section of the implement, the same provided with the mechanism shown in the preceding figure.

The body of the implement shown is of cylindrical shape, and accordingly the pieces of dough cut out by it are of circular outline. 10 is the side of this cylinder, the upper end of which is closed by a cap 11, preferably removable. The implement being of tin, the lower edge of its side serves as a cutting edge when pressed into a plastic mass, like dough, for instance, and as shown at 12 in Fig. 1. In said figure a piece of dough has just been cut out, and the implement with said piece of dough within is lifted preparatory to expelling the same. For such purpose I provide an annular plunger 13 in shape of an open ring fitted with its continuous outer edge all around against the inside of side 10 and carried at the lower part of a rod 14, which is guided in cross-pieces 15 15 of a frame, of which 16 16 are the uprights. This plunger is normally held elevated by means of a coil-spring 17, encircling a part of rod 14 near its upper end and bearing against the upper guide 15 and against a projection at the upper end of said rod 14. As shown in Fig. 2, this projection may be a pin 18, or, as shown in Fig. 5, it may consist of a nut 19. This plunger operates by being moved downwardly toward the open end of the implement, thereby pushing out the piece of dough 20 before it, as shown in Fig. 2. Chance of adherence to the plunger is avoided by the limited surface of the same, it being an open ring, which comes in contact with the margin only of the dough cut out. The operation of the plunger is by a lateral push-rod 21, which extends outwardly through an opening 22 in the side 10. At its outer end it may have a push-button 23. It is also supported by one of the uprights 16 of the frame through which it passes. The motion of the push-rod may be transmitted to the plunger-rod by any suitable operative connection, which at the same time converts the direction of the motion.

As shown in Fig. 2, part of rod 14 forms a rack 24 and is engaged by a segmental pinion 25, pivoted at 26 to a cross-piece 27, supported on the uprights of the movement frame. This pinion is at the same time engaged at 28 by the inner end of rod 21. As shown in Figs. 5 and 6, an angle-lever 29 is used, also pivoted at 26 to cross-piece 27 and connected both to the push-rod and plunger-rod. The operation is the same in both cases. Supporting members 15 15 and 27 might be secured directly to the inside of the implement without the use of frame-uprights 16. I prefer, however, to support the mechanism in an independent frame, as shown, which admits a more convenient manufacture. The whole device, push-rod 21 excepted, is then introduced through the open end of the body of the implement and suitably held in place by solder or rivets. Push-rod 21 is afterward introduced through opening 22.

30 represents openings to admit passage of air to prevent any interference or resistance thereby to the operation of the device.

Figure 4:
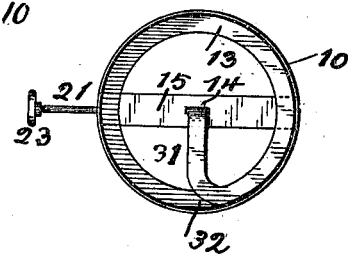

By preference I have the annular plunger 13 and its rod 14 all in one piece by bending the same, as shown most plainly in Fig. 4. The lower part of rod 14 below the lower support 15 is bent outwardly toward the side 10 of the implement and then bent around the inside of this latter to form annular plunger 13. The part connecting it with rod 14 is indicated by 31. Solder may be applied at 32. Wire is used for these parts in the form shown in Figs. 5 and 6.

As will be seen, the two manipulations of the implement—that is, the cutting out of the dough and the expelling of the cut-out piece—may rapidly follow one another without interfering with each other or without requiring a change in the position of the hand or re-formation of its grasp upon the implement. The latter is grasped, as shown in Fig. 1, with one of the fingers upon the push-button. The entire hand by bearing downwardly does the cutting, and the finger does the expelling by moving as shown in Figs. 1 and 2. Spring 17 restores the plunger to its normal position. Access for any purpose may be readily had from either end by removing cap 11.

Having described my invention, I claim as new—

1. In a dough-cutter, the combination with the hollow body of the implement, the lower end of which is open and the edge of the side of which around such open end constitutes the cutting edge, of an annular plunger in shape of an open ring fitted with its outer edge all around against the inside of this side, a rod on which it is carried, means connecting it thereto, means to support and guide this rod in a manner to permit the plunger to move to and from the open end of the body, a spring to hold the plunger normally elevated and means to depress the same.

2. In a dough-cutter, the combination with the hollow body of the implement, the lower end of which is open and the edge of the side of which body around such open end constitutes the cutting edge, of a plunger fitted within this open end, a rod on which it is carried, means to support and guide this rod in a manner to permit the plunger to move to and from the open end of the body, a spring to hold the plunger normally elevated, a laterally-projecting push-rod passing through the side of the body and means to operatively connect its inner end with the plunger-rod.

3. In a dough-cutter, the combination with the hollow body of the implement, the lower end of which is open and the edge of the side of which body around such open end constitutes the cutting edge, of a plunger fitted to the inside of the body and supported and guided therein in a manner to permit it to move to and from the open end of the body, a spring to hold the plunger normally elevated, a push-rod passing through the side of the body and with its outer end projecting therefrom and means to operatively connect its inner end with the plunger so that pressure on the push-rod depresses also the plunger.

4. In a dough-cutter, the combination with the hollow body of the implement, the lower end of which is open and the edge of the side of which body around such open end constitutes the cutting edge, of a plunger fitted within this open end, a rod on which it is carried, a frame consisting of upright members and cross-pieces and on which latter the plunger-rod is supported and guided in a manner to permit the plunger to move to and from the open end of the body, a spring encircling the plunger-rod and resting on the upper cross-piece of the frame, a projection on the upper end of the plunger-rod against which the spring also bears, thereby holding the plunger normally elevated, means operatively engaging the plunger-rod for the purpose of moving the same, said means also supported on the frame members and a laterally-projecting push-rod for actuating these means.

5. In a dough-cutter, the combination with the hollow body of the implement, the lower end of which is open and the edge of the side of which body around such open end constitutes the cutting edge, of a plunger fitted within this open end, a rod on which it is carried, means to support and guide this rod in a manner to permit the plunger to move to and from the open end of the body, a spring to hold the plunger normally elevated, a laterally-projecting push-rod passing through the side of the body and an angle-lever which connects the inner end of this push-rod with the plunger-rod.

6. In a dough-cutter, the combination with the hollow body of the implement, the lower end of which is open and the edge of the side of which body around such open end constitutes the cutting edge, of a plunger fitted within this open end, a rod on which it is carried, means to support and guide this rod in a manner to permit the plunger to move to and from the open end of the body, a spring to hold the plunger normally elevated, a laterally-projecting push-rod passing through the side of the body, a segmental pinion to which the inner end of this push-rod connects and teeth on the plunger-rod in mesh with the teeth of the pinion.

7. In a dough-cutter, the combination with the hollow body of the implement, the lower end of which is open and the edge of the side of which body around such open end constitutes the cutting edge, of an annular plunger fitted within this open end, a rod on which it is carried and of which it forms an integral part, the lower part of such rod being for such purpose bent and shaped accordingly, means to support and guide this combined plunger and rod in a manner to permit them to move to and from the open end of the body, a spring to hold this structure normally elevated and means to depress the same.

In testimony whereof I hereunto set my hand in the presence of two witnesses.

GEORGE F. ZINN.

Witnesses:
C. SPENGEL,
HENRY J. ZINN.